United States Patent
Patel et al.

(10) Patent No.: US 11,528,157 B1
(45) Date of Patent: Dec. 13, 2022

(54) FAST CONVERGENCE FOR MULTICAST TRAFFIC ON MULTILINK FAILOVER

(71) Applicant: Arista Networks, Inc., Santa Clara, CA (US)

(72) Inventors: Swati Patel, Fremont, CA (US); Bharathram Pattabhiraman, San Jose, CA (US); Rajesh Semwal, Santa Clara, CA (US); Saravanan Balasubramanian, Belmont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/530,787

(22) Filed: Nov. 19, 2021

(51) Int. Cl.
*H04L 12/18* (2006.01)
*H04L 45/16* (2022.01)

(52) U.S. Cl.
CPC ........ *H04L 12/185* (2013.01); *H04L 12/1886* (2013.01); *H04L 45/16* (2013.01)

(58) Field of Classification Search
CPC .... H04L 12/185; H04L 12/1886; H04L 45/16
See application file for complete search history.

(56) References Cited

U.S. PATENT DOCUMENTS

| | | | | |
|---|---|---|---|---|
| 10,117,206 B2* | 10/2018 | Zhu | ........................ | H04W 4/80 |
| 10,142,239 B2* | 11/2018 | Nagarajan | ................ | H04L 12/46 |
| 10,425,325 B2* | 9/2019 | Vattem | ................ | H04L 12/4633 |
| 10,536,285 B2* | 1/2020 | Nagarajan | ............. | H04L 69/324 |
| 10,938,590 B2* | 3/2021 | Subramanian | .......... | H04L 45/58 |
| 11,184,276 B1* | 11/2021 | Boutros | ................. | H04L 45/50 |
| 11,323,279 B1* | 5/2022 | N | ............................ | H04L 45/44 |
| 2017/0289217 A1* | 10/2017 | Kebler | .................... | H04L 45/16 |
| 2018/0034648 A1* | 2/2018 | Nagarajan | ............. | H04L 12/185 |
| 2018/0167315 A1* | 6/2018 | Kanjariya | ............ | H04L 12/4662 |
| 2020/0127919 A1* | 4/2020 | Nagarajan | ............. | H04L 45/28 |
| 2021/0099400 A1* | 4/2021 | Elizabeth | ................ | H04L 45/66 |

OTHER PUBLICATIONS

A. Sajassi, et al., Internet Engierring Task Force (IETF), "BGP MPLS-Based Ethernet VPN", 56 pages (Feb. 2015).
Ali Sajassi, et al., Bess Working Group, "IGMP and MLD Proxy for EVPN", 25 pages, Mar. 27, 2017.

* cited by examiner

*Primary Examiner* — Mohamed A. Wasel
(74) *Attorney, Agent, or Firm* — Fountainhead Law Group, P.C.

(57) ABSTRACT

Peer devices in a peer group of provider edge devices to which a customer edge device is multi-homed, advertise Selective Multicast Ethernet Tag (SMET) routes to other peer devices on a core to receive traffic addressed to a multicast group. The peer devices in the peer group advertise the SMET routes irrespective of whether they are the designated forwarder or not. A peer device receiving traffic for the multicast group will drop the packet if it is not the designated forwarder and will forward the packet if it is the designated forwarder.

20 Claims, 9 Drawing Sheets

IGMP(v2) message structure

| bit offset | 0-7 | 8-15 | 16-31 |
|---|---|---|---|
| 0 | TYPE | MAX RSP TIME | CHECKSUM |
| 32 | GROUP ADDRESS | | |

FIG. 4

EVPN TYPE 7 route structure

| RD (8 octets) |
|---|
| Ethernet Segment Identifier (10 octets) |
| Ethernet Tag ID (4 octets) |
| Multicast Source Length (1 octet) |
| Multicast Source Address (variable) |
| Multicast Group Length (1 octet) |
| Multicast Group Address (variable) |
| Originator Router Length (1 octet) |
| Originator Router Address (variable) |
| Flags (1 octet) |

FIG. 5

EVPN TYPE 6 route (SMET) structure

| RD (8 octets) |
|---|
| Ethernet Tag ID (4 octets) |
| Multicast Source Length (1 octet) |
| Multicast Source Address (variable) |
| Multicast Group Length (1 octet) |
| Multicast Group Address (variable) |
| Originator Router Length (1 octet) |
| Originator Router Address (variable) |
| Flags (1 octet) |

FAST CONVERGENCE FOR MULTICAST TRAFFIC ON MULTILINK FAILOVER

BACKGROUND

Multilink networking allows devices to communicate over two or more links; e.g., Ethernet connections. Multilink protocols coordinate multiple independent links connected between a pair of network devices, providing a virtual link between the two devices having a bandwidth substantially equal to the combined bandwidth of the individual links. In addition to improving bandwidth, aggregating multiple links can add a level of fault tolerance to the connection between the network devices, because traffic can failover to surviving links when one or more links fail.

Multicasting is used to distribute data (for example, audio/video streaming broadcasts) from a source to multiple recipients. Multicast protocols allow a source to send a single copy of data to a multicast address (group), which is then distributed to an entire group of recipients. A multicast group identifies a set of recipients that are interested in a particular data stream. Data is addressed to the group and forwarded to all members of the multicast group. Such packets are referred to as multicast packets, where the packets target the multicast group.

Multicasting can be applied to a class of packets referred to as broadcast packets. Broadcast traffic is used to transmit a message to any reachable destination in the network without the need to know any information about the receiving party. Unknown-unicast traffic happens when a network device receives unicast traffic intended for a destination that is not in the forwarding information base of the network device. For unknown-unicast packets the network device floods the packet to all of its forwarding ports. The broad category of multicast traffic is collectively referred to as Broadcast, Unknown unicast, and Multicast (BUM) traffic.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
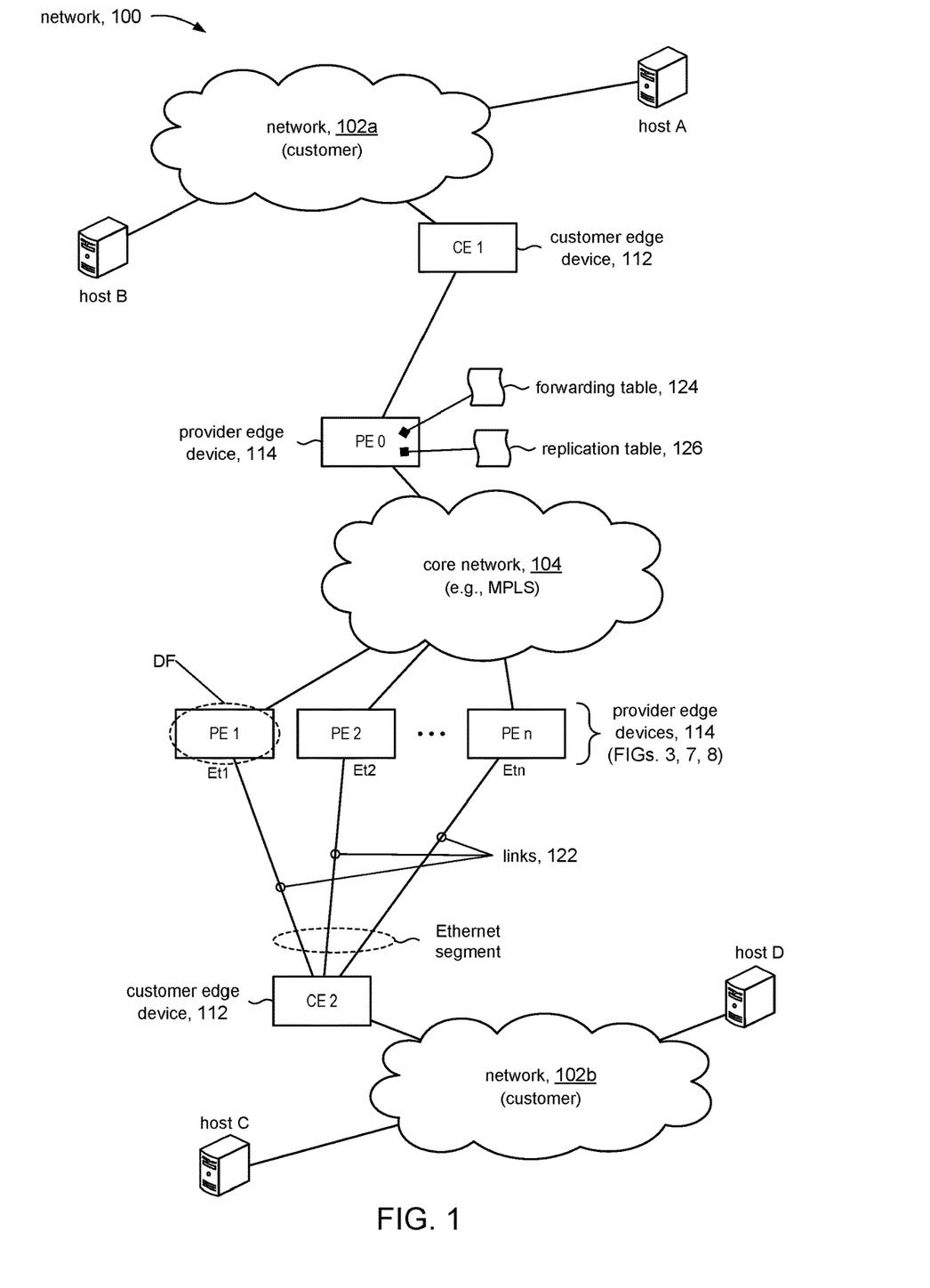
FIG. 1 is a high level diagram of a network configuration adapted in accordance with the present disclosure.

FIG. 1 shows an illustrative communication system 100 adapted in accordance with the present disclosure. Communication system 100 will be described in accordance with Ethernet virtual private network (EVPN) technology to provide context for a discussion of various aspects of the present disclosure. EVPN is a well understood technology and is described in the Internet Standard RFC 7432, which is incorporated herein by reference for all purposes. It will be appreciated, however, that communication system 100 can be based on other similar network architectures and technologies.

Communication system 100 includes customer networks 102a, 102b to which hosts (e.g., servers, client machines, etc.) can be connected. For example, host A and host B are deployed in customer network 102a and host C and host D are shown deployed in customer network 102b.

Communication system 100 includes core network 104. In some embodiments, for example, core network 104 can be a Multi Protocol Label Switching (MPLS) core. Customer edge (CE) devices 112 on customer networks 102a, 102b can connect to respective provider edge (PE) devices 114 on core 104 to provide data paths between the customer networks. Edge devices 112, 114 can be any suitable network devices such as routers, switches, and the like.

In some embodiments, a customer edge device can be multi-homed to two or more provider edge devices (PEs). FIG. 1, for example, shows CE 2 having multiple links 122 to provider edge devices PE 1 to PE n. Although not shown in the figure, each link 122 is connected to a respective port (interface) on CE 2. The links can be collectively referred to as a link aggregation group (LAG) or, in the context of EVPN, an Ethernet segment (ES). Provider edge devices that are multi-homed to a CE on the same Ethernet segment can be referred to as "peer" devices on that Ethernet segment. The peers devices associated with a given Ethernet segment can be collectively referred to as a peer group or a redundancy group.

Figure 2:
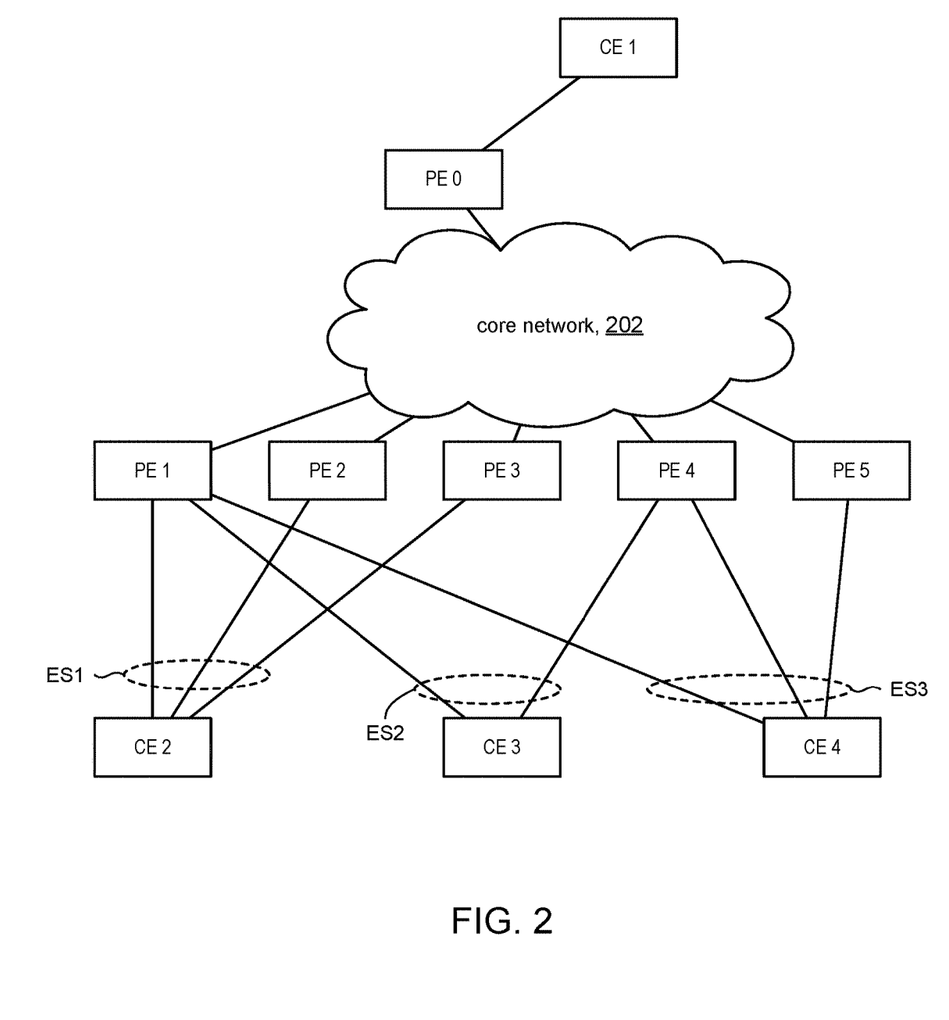
FIG. 2 shows an example of peer devices associated with multiple Ethernet segments.

Referring for a moment to FIG. 2, provider edge devices can be associated with multiple Ethernet segments (peer groups). The configuration in FIG. 2 comprises core network 202 configured with PEs PE 0 to PE 5. The link between PE 0 and customer edge device CE 1 can be referred to as an Ethernet segment comprising a single link. PE 1 to PE 5 are members of three peer groups corresponding to three Ethernet segments ES1, ES2, ES3. The peer group associated with Ethernet segment ES1 comprises PE 1, PE 2, and PE 3. Likewise, the peer group associated with Ethernet segment ES2 comprises PE 1 and PE 4, and the peer group associated with Ethernet segment ES3 comprises PE 1, PE 4, and PE 5. As can be seen in FIG. 2, PE 1 is associated with three Ethernet segments ES1, ES2, ES3. Likewise, PE 4 is associated with two Ethernet segments ES2, ES3.

Continuing with FIG. 1, each PE includes a forwarding table stored in its memory that informs the PE how to reach CEs. For example, forwarding table 124 in PE 0 would inform PE 0 that CE 2 can be reached via provider edge devices PE 1, PE 2, to PE n. When PE 0 receives a known unicast packet from a CE 1 that is destined for CE 2, the PE can choose which one of PE 1 to PE n to forward the known unicast packet. Similar PE 1 to PE n include similar forwarding tables, but are omitted from the figure to avoid cluttering the figure.

On the other hand, when a PE receives a multicast packet for a given multicast group (address), there is no single destination to which the multicast packet is forwarded. The PE generally forwards (floods) the packet to the other PEs on core network 104. For example, each PE includes a replication table stored in its memory that identifies the PEs to which a multicast packet for a multicast group will be sent. For example, replication table 126 in PE 0 would include PEs that are interested in receiving multicast packets for a given multicast group (e.g., identified by a group number). When PE 0 receives a multicast packet for a given multicast group (e.g., from CE 1), PE 0 can replicate the packet and transmit the replicas to PEs identified in replication table 126. It will be appreciated that the present disclosure is applicable to broadcast, unknown unicast, and multicast (BUM) packets in general.

PEs can advertise their interest in receiving multicast traffic destined for a particular multicast group to other PEs on the core. Stated differently, PEs can join a particular multicast group. In the context of EVPN, for example, a given PE on the core can advertise an EVPN Type 6 Selective Multicast Ethernet Tag (SMET) route to other PEs on the core to indicate to those other PEs that the given PE is interested in receiving multicast traffic for a multicast group. When a PE receives an advertised SMET route, the receiving PE can add the peer device identified in the SMET route to its replication table (e.g., 126, FIG. 1).

In the case of a CE that is multi-homed to a peer group comprising two or more PEs, only one of the PEs in that peer group should advertise to receive multicast traffic for the CE; otherwise, the CE can receive duplicate packets from the peer group. RFC 7432, for example, provides a mechanism in which only one peer, referred to as a designated forwarder (DF), is elected to receive multicast packets on behalf of the peer group. More specifically, per RFC 7432, only the DF in the peer group advertises a SMET route to other PEs on the core to indicate its interest in receiving multicast traffic for a given multicast group; the other peers in the peer group do not advertise SMET routes. In this way, a PE that receives a multicast packet addressed to the given multicast group will forward a replicated packet to only the DF in the peer group. Further details of this aspect of the present disclosure will now be discussed.

Figure 3:
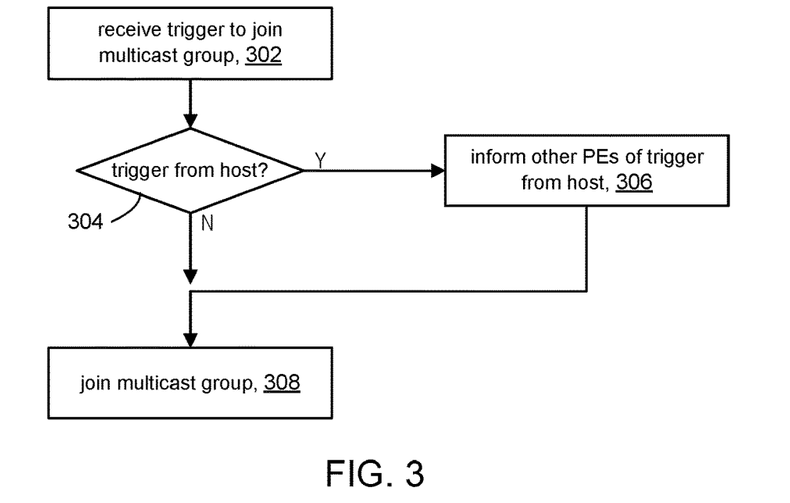
FIG. 3 shows a high level flow for triggering the sending of join messages in accordance with the present disclosure.

Referring to FIG. 3, the discussion will now turn to a high level description of processing in a peer device (e.g., PE 1) in a peer group, in accordance with the present disclosure. In some embodiments, for example, the peer device can include computer executable program code stored in a memory of the peer device, which when executed by a processor (e.g., 1302, FIG. 13), can cause the processor to perform processing in accordance with FIG. 3. The flow of operations performed by the processor is not necessarily limited to the order of operations shown.

In accordance with the present disclosure, processing in accordance with FIG. 3 is performed by at least two or more peer devices in the peer group, including the DF and at least one or more non-DFs. In some embodiments, for example, each peer in the peer group can be configured to operate in accordance with the operations of FIG. 3. In other embodiments, the operations of FIG. 3 may be practiced by less than all of the peers in the peer group.

Figure 4:
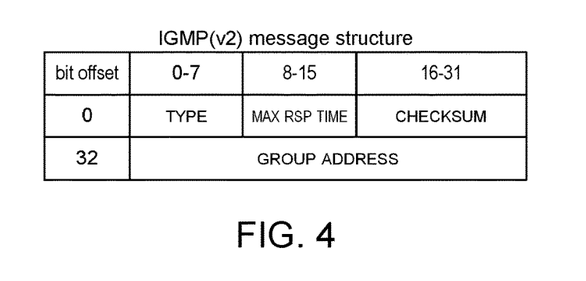
FIG. 4 shows the structure of an Internet Group Management Protocol (IGMP) message.

At operation 302, the peer device can receive a trigger to join a multicast group. In some embodiments, for example, the trigger can be a join message, sent from a host to the peer device, that specifies a multicast group. The join message informs the peer device of the host's interest in becoming a member of the multicast group specified in the join message to receive packets addressed to the multicast group. Referring to FIG. 1, for example, when a host (e.g., host A) wants to receive multicast packets for a given multicast group (address), the host can transmit an Internet Group Management Protocol (IGMP) message to join and become a member of that multicast group. FIG. 4 shows an example of an IGMP (v2) message, where the TYPE field can be set to 0x16 to register for a multicast group and the GROUP ADDRESS field specifies the multicast group. The host can encapsulate the IGMP message as the payload in an IP packet and transmit the IP packet to the peer device (e.g., PE 0).

Figure 5:
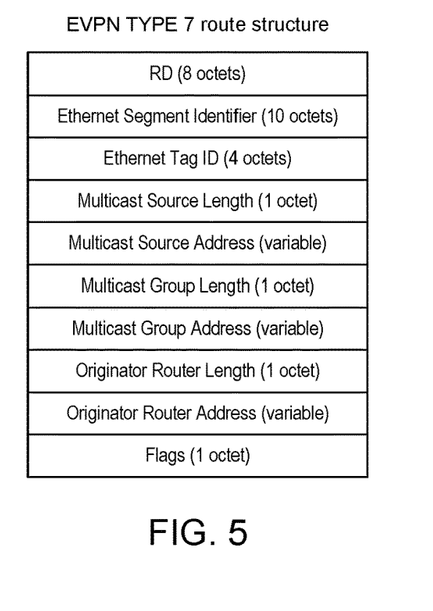
FIG. 5 shows the structure of a Type 7 route.

In other embodiments, the trigger to join a multicast group can be a message sent by another PE in the same peer group that informs the peer device that a host connected to the peer group is interested in joining a multicast group (see operation 306). For example, an Internet-Draft document authored by the BESS Working Group entitled "IGMP and MLD Proxy for EVPN" (incorporated herein in its entirety) defines a synchronization mechanism referred to as an EVPN Type 7 route. The EVPN Type 7 route is a message that is exchanged between all PEs on the core (e.g., core network 104, FIG. 1), and allows peer devices in a peer group (i.e., connected on the same Ethernet segment, ES) to coordinate IGMP multicast group memberships between the peer devices attached to that Ethernet segment. For example, when a peer receives an IGMP message from a connected CE, that peer can inform the other peers in the peer group of the IGMP message using the Type 7 route. FIG. 5 shows details for an EVPN Type 7 route. The ETHERNET SEGMENT IDENTIFIER field specifies an ES to which the sending PE is associated; the MULTICAST GROUP ADDRESS field contains a list of multicast group(s) of which the sending PE is a member. A received Type 7 route can be deemed to be a trigger, when the Type 7 route specifies an ES in common with the peer device.

At decision point 304, if the trigger is from a host (e.g., the host sent an IGMP message to the peer device), then the peer device can continue processing at operation 306. If the trigger is from another PE in the same peer group as the peer device (e.g., a PE on the core sent an EVPN Type 7 route to the peer device that includes an ES with which the peer device is associated), then the peer device can continue processing at operation 308.

At operation 306, the peer device can inform PEs on the core that the peer device received a message from a host expressing the host's interest in joining a multicast group. In some embodiments, for example, the message can be an IGMP join message (described above). In response to the IGMP join message, the peer device can create an EVPN Type 7 route that (1) specifies the Ethernet segment on which the host is connected and (2) contains a list of multicast groups that the peer device is associated with, including the multicast group specified in the IGMP join message. The Type 7 route can be transmitted to all other PEs on the core and may serve as a trigger described above at operation 302. The peer device can continue processing at operation 308.

Figure 6:
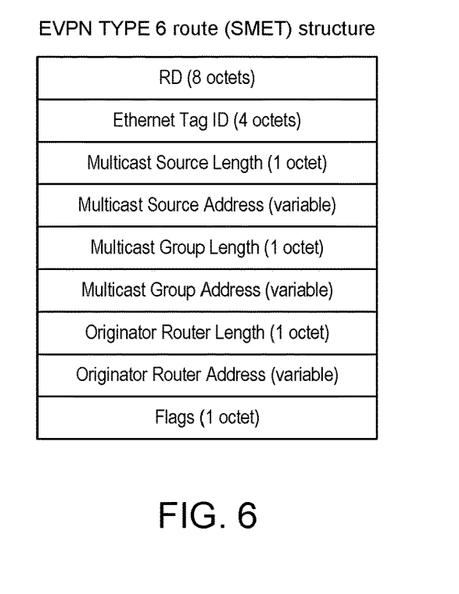
FIG. 6 shows the structure of a Type 6 route.

At operation 308, the peer device can join the multicast group specified in the trigger received at operation 302, for example, the multicast group specified in an IGMP message from a host or the multicast group specified in an EVPN Type 7 route from a PE on the core. In some embodiments, the peer device can express its interest in joining the multicast group specified in the trigger by advertising an EVPN Type 6 route, also referred to as a Selective Multicast Ethernet Tag (SMET) route, to PEs on the core. FIG. 6 shows details for a SMET route. The SMET route informs the receiving PE that the peer device is interested in joining the multicast group specified in the SMET route in order to receive multicast packets addressed to the multicast group. Processing the trigger can be deemed complete.

As noted above, processing in accordance with FIG. 3 is performed by at least two or more peer devices in the peer group, including the DF and at least one or more non-DFs. As such, PEs on the core will receive SMET routes from at least two peers in a given peer group, including the DF and one or more non-DFs. In other words, a peer device in a peer group can express interest in joining a multicast group (e.g., by advertising SMET routes to PEs on the core) regardless of whether that peer device is the DF or not the DF. More generally, in accordance with the present disclosure, peers in a peer group can express their interest in joining one or more multicast groups irrespective of whether they are the elected DF or not. In other words, expressing interest in a multicast group (e.g., via SMET route adverts) occurs independently of whether or not a peer device is the DF. In accordance with the present disclosure, the SMET advertisements are independent of the "DF-ness" of the peer device; i.e., SMET advertisements can be sent by a peer device irrespective of the DF-ness of the peer device. As will be discussed, in some embodiments, at least two or more peers in a peer group advertise SMET routes. In some embodiments, for example, every peer in a peer group will advertise SMET routes.

When a PE on the core (e.g., PE 0) receives a SMET route from a DF and at least one non-DF in a given peer group, the PE will add the DF and the non-DF to its replication table (e.g., 126, FIG. 1). As a consequence, when a CE (e.g., CE 1) sends a multicast packet to the PE, the PE will replicate the multicast packet and transmit the replicated multicast packet to the DF and to the non-DF in the peer group. This aspect of the present disclosure will now be discussed.

Figure 7:
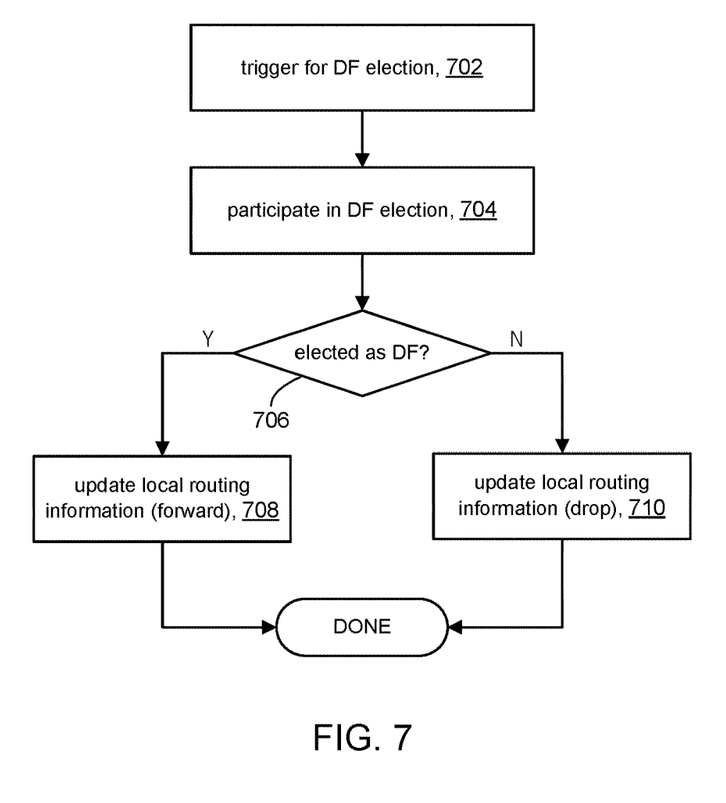
FIG. 7 is a high level flow for electing a designated forwarder in accordance with the present disclosure.

Referring to FIG. 7, the discussion will now turn to a high level description of processing the election of a DF in a peer device (e.g., PE 1) belonging to a peer group, in accordance with the present disclosure. In some embodiments, for example, the peer device can include computer executable program code stored in a memory of the peer device, which when executed by a processor (e.g., 1302, FIG. 13), can cause the processor to perform processing in accordance with FIG. 7. The flow of operations performed by the processor is not necessarily limited to the order of operations shown.

In accordance with the present disclosure, processing in accordance with FIG. 7 is performed by at least two or more peer devices in the peer group, including the DF and at least one or more non-DFs. In some embodiments, for example, each peer in the peer group can be configured to operate in accordance with the operations of FIG. 7. In other embodiments, the operations of FIG. 7 may be practiced by less than all of the peers in the peer group.

At operation 702, the peer device can receive a trigger or otherwise detect an event to initiate a process to elect a designated forwarder (DF) from among PEs comprising the peer group for a given multicast group. The election process can be triggered by the detection of a failure in the DF; for example, when the DF fails or otherwise becomes unresponsive. In the case of a downed DF, the DF becomes unreachable to other members in the peer group, thus triggering the election process. The election process can be triggered in response to the addition or withdrawal of EVPN Ethernet segment routes. For example, if a link failure occurs on the DF, the DF will detect the downed link and advertise withdrawal of the corresponding Ethernet segment route, thus triggering the election process. The occurrence of such events can trigger failover processing to reconverge traffic by replacing the old DF with a new DF.

At operation 704, the peer device can participate in the election process. In some embodiments, the peer devices in a peer group can elect a designated forwarder (DF) from among themselves for the given multicast group. RFC 7432, for example, specifies a modulus based DF election algorithm that uses the IP addresses of the peers in the peer group to elect the DF. It will be appreciated, however, that the election process can employ any suitable algorithm to elect a new DF.

At decision point 706, if the peer device determines that it has been elected the new DF, the peer device can continue processing at operation 708. If the peer device determines that it has not been elected the new DF, the peer device can continue processing at operation 710. Note that each peer in a peer group participates in the DF election. Accordingly, one peer will be elected DF and the other peers will be non-DF's.

Peer Device is the New Designated Forwarder

At operation 708, the peer device, being the newly elected DF, can update its local routing information (e.g., forwarding table 124) to forward multicast packets received from PEs on the core (e.g., core network, 104). For example, the forwarding table would have the multicast group and a list of L2 ports for that group (for example, ethernet ports) and on the DF. The L2 ports would include the ethernet segment connecting to CE2 (e.g., FIG. 9). On the non-DF, the L2 ports would NOT include the ethernet segment connecting to CE2. Processing a DF election in accordance with the present disclosure can be deemed complete.

Peer Device is NOT the New Designated Forwarder

At operation 710, the peer device, being a non-DF, can update its local routing information (e.g., forwarding table 124) to drop multicast packets received from PEs on the core. Processing a DF election in accordance with the present disclosure can be deemed complete.

Figure 8:
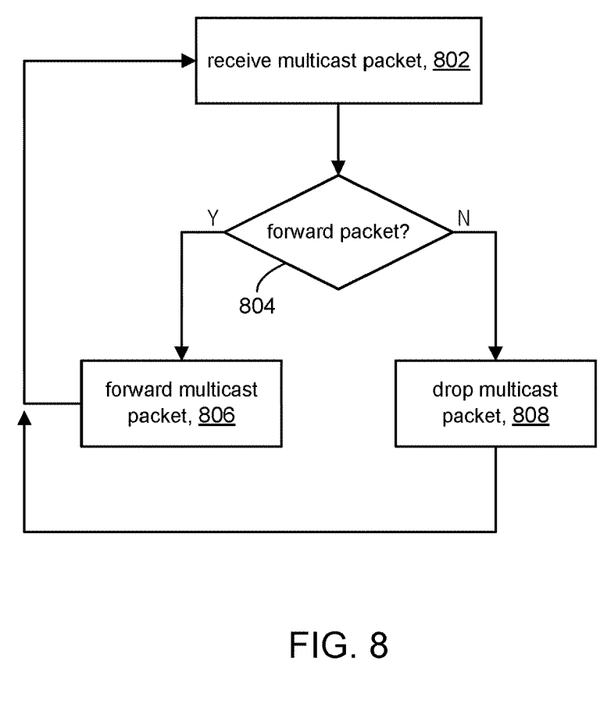
FIG. 8 illustrates processing multicast traffic in accordance with the present disclosure.

Referring to FIG. 8, the discussion will now turn to a high level description of processing a received multicast packet in a peer device (e.g., PE 1) belonging to a peer group, in accordance with the present disclosure. In some embodiments, for example, the peer device can include computer executable program code stored in a memory of the peer device, which when executed by a processor (e.g., 1302, FIG. 13), can cause the processor to perform processing in accordance with FIG. 8. The flow of operations performed by the processor is not necessarily limited to the order of operations shown.

At operation 802, the peer device can receive a multicast packet from a PE to which the peer device had previously advertised a SMET route. As explained above, in accordance with the present disclosure, the peer device can advertise SMET routes to PEs on the core regardless of whether the peer device is the DF or not the DF. Accordingly, the peer device can receive multicast traffic from a PE even though the peer device is not the DF.

At decision point 804, the peer device can determine whether or not to forward the multicast packet. In some embodiments, for example, the determination can be made based on information programmed in the forwarding table of the peer device (per FIG. 7) to either forward the packet (operation 806) or to drop the packet (operation 808).

At operation 806, the peer device, operating as the DF, can forward the received multicast packet in accordance with forwarding information stored in the hardware of the peer device (e.g., forwarding table 124). The peer device can use information in the received multicast packet (e.g., destination MAC address) to identify an egress port on the peer device on which to forward the packet. In the context of EVPN, the forwarding logic in the peer device can associate the received multicast packet to an Ethernet segment, which in turn can identify the corresponding egress port on the peer device connected to the CE that is multi-homed to the peer group. Processing can return to operation 802 to receive the next multicast packet.

At operation 808, the peer device, operating as a non-DF, can drop the received multicast packet. For example, the forwarding table in the non-DF peer can be programmed to drop multicast packets (operation 710). Thus, although the non-DF peer receives multicast packet from a PE (because it had advertised a SMET route to the PE per operation 308), the non-DF can drop the packet and thus prevent duplicate multicast packets being forwarded to the CE that is multi-homed to the peer group. Processing can return to operation 802 to receive the next multicast packet.

Illustrative examples will now be described to provide context for the foregoing flows. The examples will be explained in an EVPN-MPLS deployment.

Figure 9:
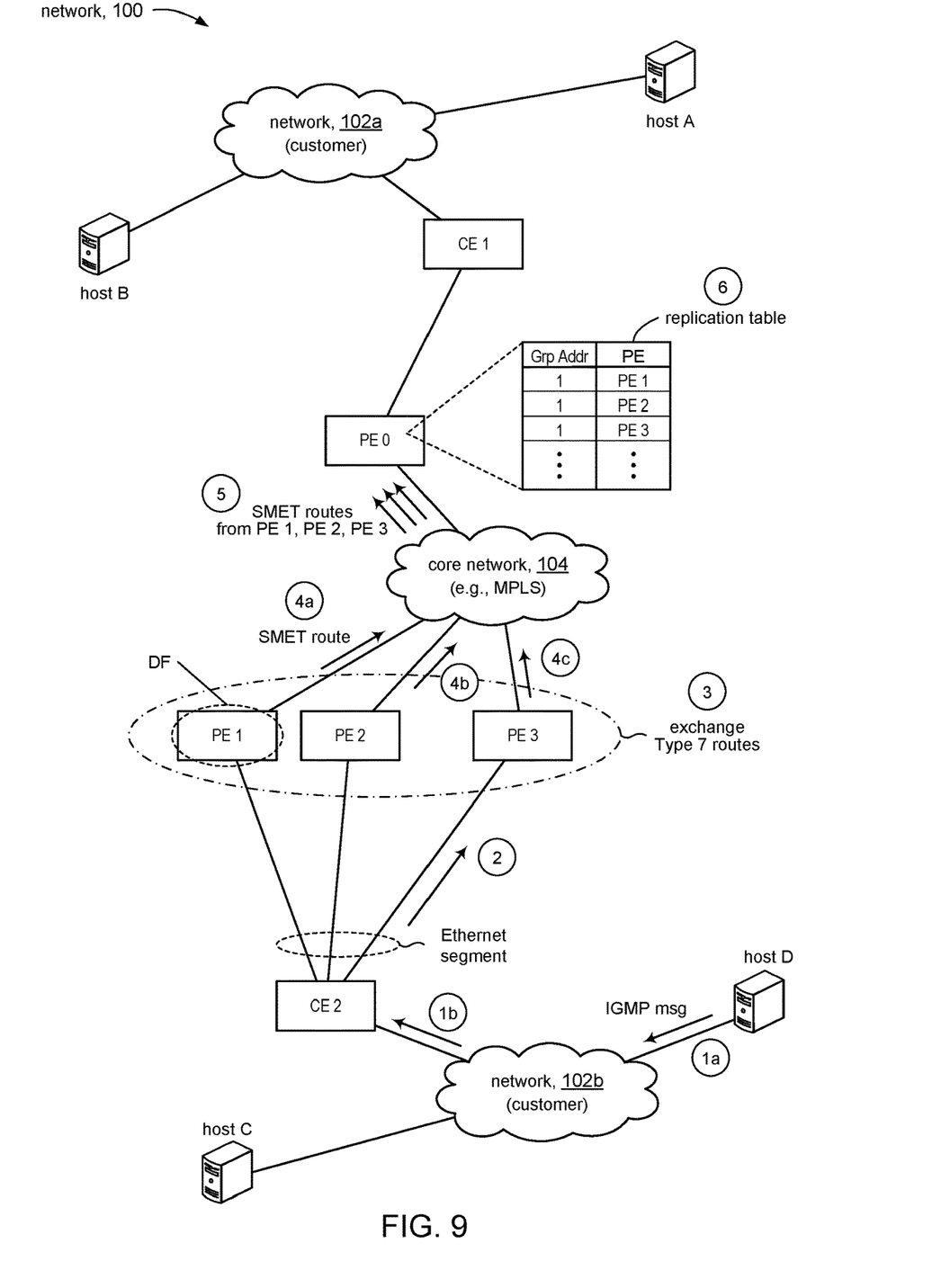
FIG. 9 shows a sequence illustrating joining a multicast group in accordance with the present disclosure.

FIG. 9 shows a sequence of activity to illustrate an example of joining a multicast group in accordance with the present disclosure, for example, as explained in FIG. 3. The circled numbers represent time indices. The configuration in FIG. 9 shows that CE 2 is multi-homed to a peer group comprising three PEs, namely PE 1, PE 2, PE 3. FIG. 9 further shows that PE 1 in the peer group has been previously elected the DF. As explained below, per FIG. 7, we see that because PE 1 was elected DF, its forwarding table will have been programmed to forward multicast packets. Similarly, PE 2 and PE 3, as non-DFs, will have programmed their respective forwarding tables to drop multicast packets.

At time index 1a and time index 1b, an IGMP message is transmitted from host D to CE 2. The IGMP message includes a multicast group (e.g., Group Address 1) of interest to host D.

At time index 2, CE 2 transmits the IGMP message with Group Address 1 to one of the peers in the peer group, namely PE 3. For discussion purposes, CE 2 can be viewed as a proxy for hosts connected to customer network 102b. (Operation 302)

At time index 3, the PEs on core 104 will synchronize their join states for Group Address 1. FIG. 9 represents the exchange of Type 7 routes among the PEs on core 104, including PE 1, PE 2, PE 3. (Operation 306)

At time indices 4a, 4b, 4c, each peer device in the peer group in accordance with the present disclosure, can advertise a SMET route to the PEs on the core to inform the PEs that peer devices PE 1, PE 2, PE 3 want to join the multicast group identified by Group Address 1. (Operation 308) Note that, in accordance with the present disclosure, one or more non-DFs advertise a SMET route in addition to the DF.

At time index 5, FIG. 9 shows PE 0 having received a SMET route from PE 1, another SMET route from PE 2, and another SMET route from PE 3. Although not shown, it will be understood that other PEs on the core will also receive SMET routes from PE 1, PE 2, and PE 3. (Operation 308)

At time index 6, PE 0 programs its replication table with information from the received SMET routes, including an identifier that identifies the PE (e.g., IP address) and a multicast group (in our example Group Address 1). (Operation 308). It is noted that PE 0 programs its replication table based on having received a SMET route, and not on whether the sender of the SMET route is a DF or a non-DF. Accordingly, per the present disclosure, PE 0 includes in its replication table the address of non-DFs in the peer group in addition to the DF for Group Address 1.

Figure 10:
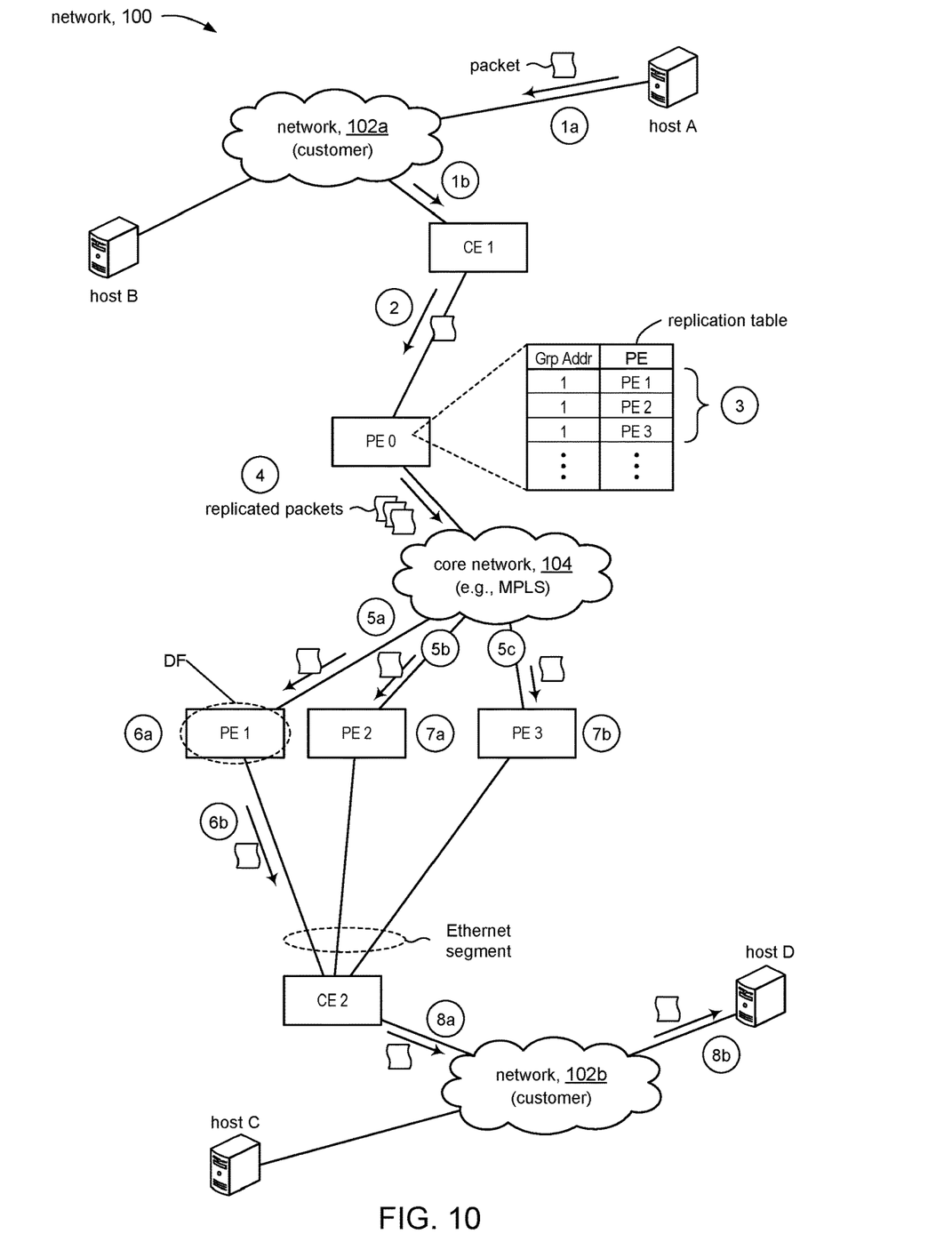
FIG. 10 shows a sequence illustrating multicast traffic flow in accordance with the present disclosure.

FIG. 10 continues from FIG. 9 and shows a sequence of activity to illustrate an example of processing a received multicast packet in accordance with the present disclosure, for example, as explained in FIG. 8. The circled numbers represent time indices.

At time index 1a and time index 1b, a multicast packet is transmitted from host A on customer network 102a to CE 1. Suppose for discussion purposes, the multicast packet is addressed to multicast group 1.

At time index 2, CE 1 forwards the multicast packet to PE 0.

At time index 3, PE 0 uses its replication table to determine that the packet should be sent to PE 1, PE 2, PE 3, and possibly to other PEs in the replication table associated with multicast group 1 (although not shown).

At time index 4, PE 0 replicates and transmits the replicated multicast packets to the PEs identified in the replication table, including PE 1, PE 2, PE 3. It will be appreciated that in some embodiments, the packets can be replicated in the core. Notably, non-DFs in the peer group receive the multicast packet in addition to the DF of the peer group.

At time indices 5a, 5b, and 5c, PE 1, PE 2, and PE 3, respectively receive the replicated multicast packet. (Operation 802)

At time index 6a, PE 1 performs a lookup on the multicast packet using the forwarding table stored in PE 1. As explained above in connection with FIG. 7 and illustrated by example in FIG. 11 below, because PE 1 is the DF, the forwarding table informs PE 1 to forward the packet. Accordingly, at time index 6b, PE 1 forwards the multicast packet to CE 2. (Operation 806)

At time indices 7a and 7b, PE 2 and PE 3, likewise, perform lookups on the multicast packet using their respective forwarding tables. As explained above in connection with FIG. 7 and illustrated by example in FIG. 11 below, because PE 2 and PE 3 are non-DFs, their forwarding tables inform PE 2 and PE 3 to drop the packet. Accordingly, PE 2 and PE 3 drop the packet. (Operation 808) Note that despite the packet having been replicated to every peer device in the peer group, CE 2 receives the packet only from the DF, namely PE 1.

At time indices 8a and 8b, CE 2 forwards the packet to host D via customer network 102b.

Figure 11:
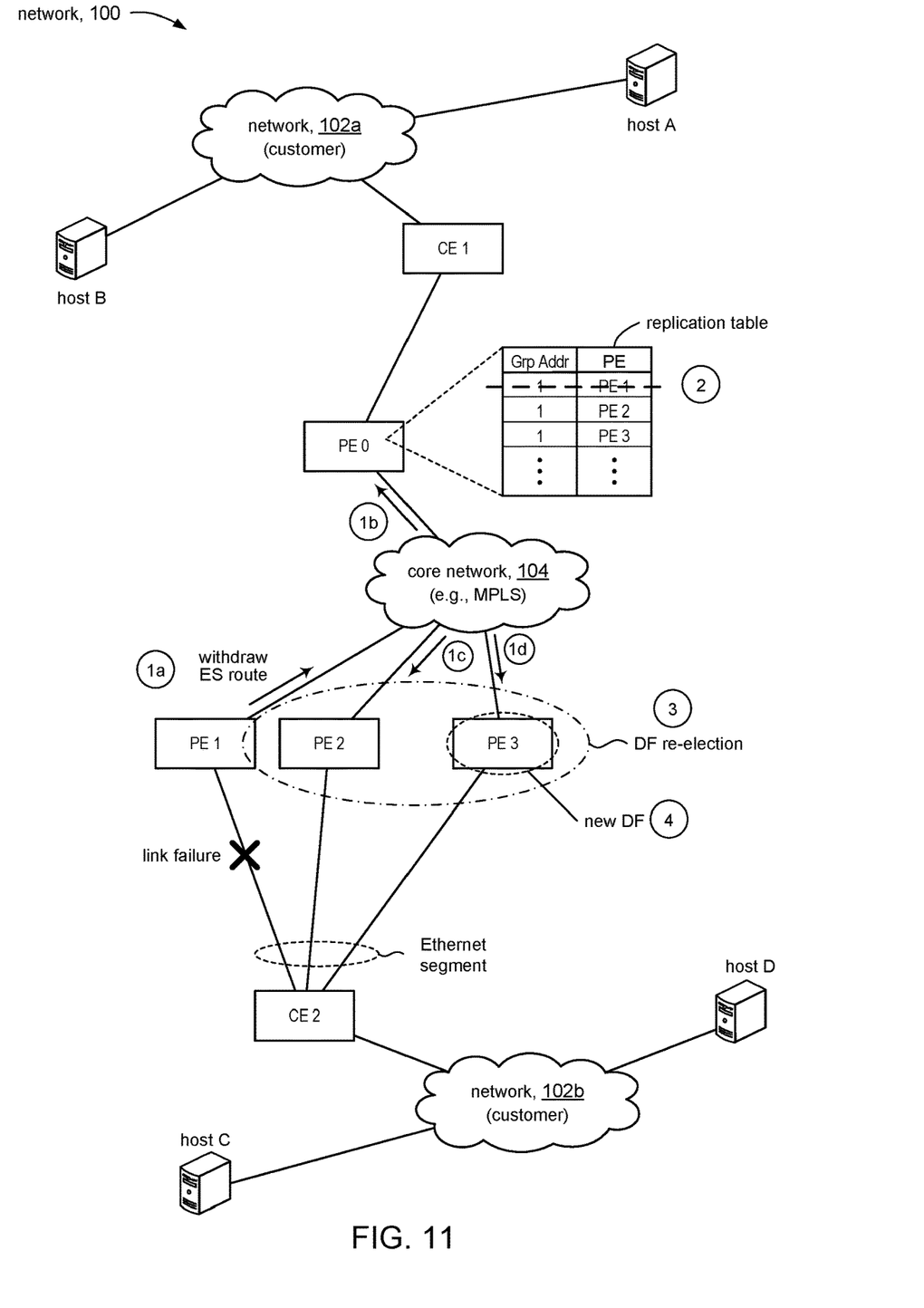
FIG. 11 shows a sequence illustrating electing a new designated forwarder in accordance with the present disclosure.

FIG. 11 continues from FIG. 10 and shows a sequence of activity to illustrate an example of electing a new DF in accordance with the present disclosure, for example, as explained in FIG. 7. The circled numbers represent time indices. For discussion purposes, suppose the link between PE 1 and CE 2 goes down (link failure). PE 1 will detect this and advertise withdrawal of the corresponding Ethernet segment route. This occurrence can serve as a trigger to initiate the election of a new DF. (Operation 702)

At time indices 1a, 1b, 1c, 1d, PE 1 advertises its withdrawal of the Ethernet segment route in response to the link down.

At time index 2, PE 0 removes or otherwise deactivates the entry for PE 1 in its replication table in response to receiving withdrawal of the Ethernet segment route from PE 1.

At time index 3, a re-election process takes place between the remaining peers, namely PE 2 and PE 3, in response to PE 1 advertising its withdrawal of the Ethernet segment route. (Operation 704) It is noted that during the election process, PE 0 can continue to receive multicast packets (e.g., from CE 1) and, per the replication table, forward the multicast packets to PE 2 and PE 3. PE 2 and PE 3 will drop the packets because their forwarding information is still configured to drop multicast packets.

At time index 4, suppose PE 3 becomes the newly elected DF. PE 3, as the new DF, updates its forwarding table to now forward multicast packets to CE 2 instead of dropping the packets. (Operation 708) PE 2, as a non-DF updates its forwarding table to drop multicast packets. (Operation 710) Because PE 2 was previously a non-DF, its forwarding table is already programmed to drop multicast packets, and so the update does change its forwarding information.

DF election processing in accordance with the present disclosure can be deemed complete. Notably, election of a new DF in accordance with the present disclosure does not include the newly elected DF (PE 3 in this example) sending a SMET route to PE 0. As can be seen in FIG. 11, the replication table in PE 0 is already programmed to replicate multicast packets to PE 3 (and to PE 2). Only the newly elected DF needs to update its forwarding table to forward rather than drop multicast packets.

Figure 12:
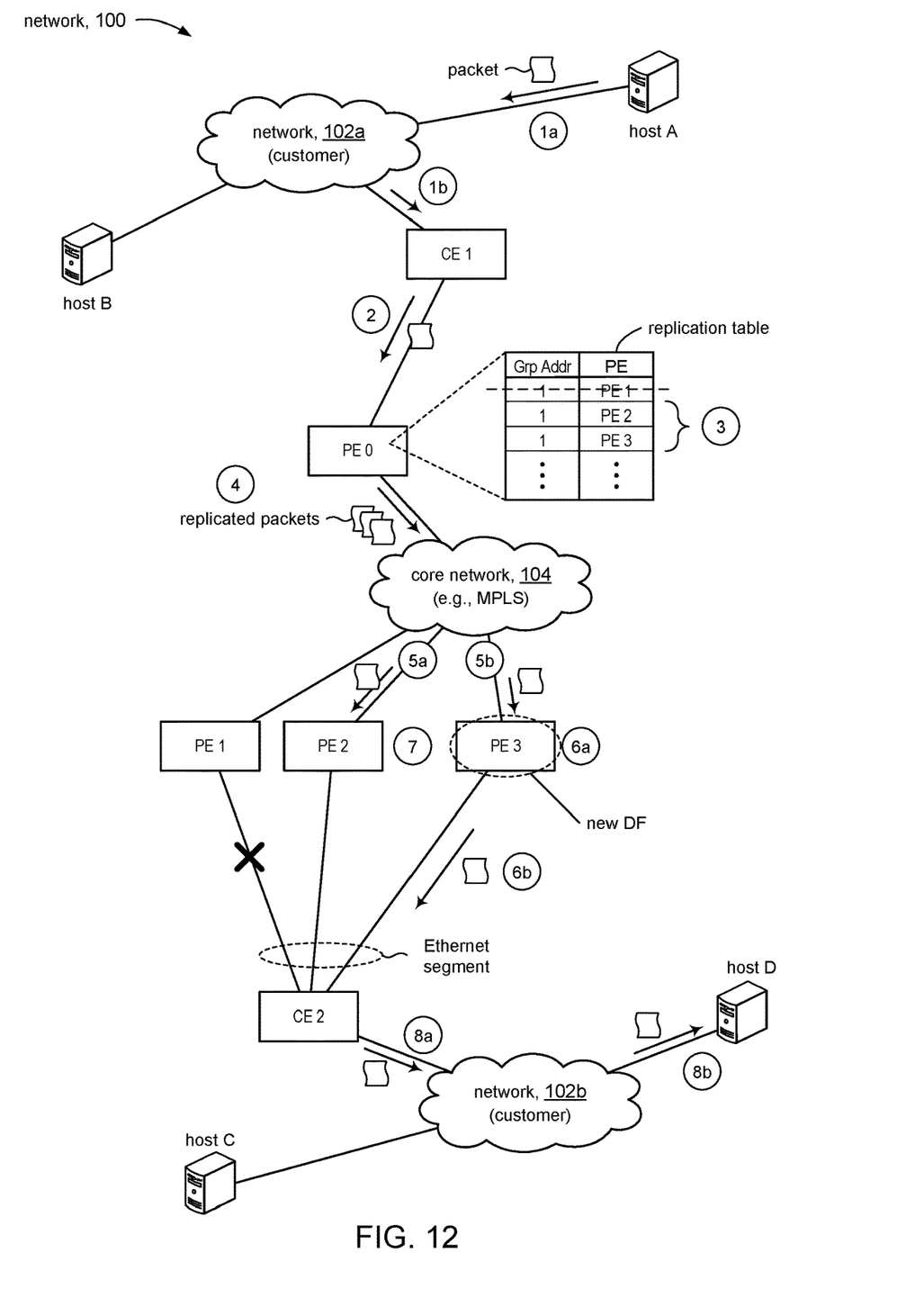
FIG. 12 shows a sequence illustrating multicast traffic flow subsequent to election of a new designated forwarder in accordance with the present disclosure.

FIG. 12 continues from FIG. 11 and shows a sequence of activity to illustrate an example of processing a multicast packet subsequent to election of a new DF in accordance with the present disclosure. The circled numbers represent time indices.

At time indices 1a and 1b, host A transmits a multicast packet on customer network 102a to CE 1. For discussion purposes, the multicast packet is addressed to multicast group 1.

At time index 2, CE 1 forwards the multicast packet to PE 0.

At time index 3, PE 0 uses its replication table to determine that the packet should be sent to PE 2 and PE 3.

At time index 4, PE 0 replicates and transmits the multicast packet to the PEs identified using the replication table, which include PE 2 and PE 3.

At time indices 5a and 5b, PE 2 and PE 3, respectively receive the multicast packet.

At time index 6a, PE 3 performs a lookup on the multicast packet using the forwarding table stored in PE 3. As explained above, because PE 3 was elected to be the DF, the forwarding table stored in PE 3 was updated to inform PE 3 to forward multicast packets. Accordingly, at time index 6b, PE 3 forwards the multicast packet to CE 2.

At time index 7, PE 2, likewise, performs a lookup on the multicast packet using its forwarding table. As explained above, because PE 2 is a non-DF, its forwarding table informs PE 2 to drop the packet. Accordingly, PE 2 drops the packet and CE 2 receives the multicast packet only from the DF, namely PE 3.

At time indices 8a and 8b, CE 2 forwards the packet to host D via customer network 102b.

An advantageous aspect of the present disclosure is that the process of electing a new DF for a peer group, in response to a failure of the existing DF (e.g., link down), does not require the newly elected DF to join a multicast group as part of the election process. Conventional processing, for example, includes electing a new DF, advertising SMET routes to PEs on the core to inform of the new DF's membership to the multicast group, the PEs responding to the SMET routes by updating their replication tables to reflect the newly elected DF, and the newly elected DF updating is own forwarding table to forward multicast packets. In summary, the critical path for failing over to a new DF for traffic convergence includes: electing a new DF, the new DF advertising SMET routes, updating replication tables in the PEs, and updating forwarding information in the new DF. Until PEs on the core are configured for the new DF, multicast traffic from the PEs can become disrupted because PEs will continue to send multicast packets to the old DF. The multicast disruptions can be prolonged in configurations where a downed DF is associated with many multi-homed ES segments.

By comparison, in accordance with the present disclosure as shown in FIGS. 3 and 9, when a CE on a multi-homed link expresses interest in joining a multicast group on behalf of a host connected to the CE, this will trigger each peer device in the peer group to join the multicast group by sending a join message (e.g., SMET route) to PEs on the core. The join messages result in the PEs replicating multicast packets to each peer device in the peer group, not just the DF. When a new DF is elected from among the peers (e.g., because of a link down on the old DF), the PEs will already be replicating multicast packets to the newly elected DF. In summary, the critical path for failing over to a new DF for traffic convergence in accordance with the present disclosure includes: electing of a new DF and updating forwarding information in the new DF. The new DF does not have to inform the PEs of its membership to the multicast group. More significantly, the PEs do not need to update their replication tables to reflect the newly elected DF. Multicast traffic can resume as soon as the new DF has been elected and has programmed its forwarding information to forward multicast packets.

Failover processing in accordance with the present disclosure can reduce convergence time because the DF does not have to advertise SMET routes to the PEs, and the PEs do not have to update their forwarding information. The reduction can be significant in a failed link where many multicast groups flow through the failed link; forwarding information in many PEs need to be reprogrammed before traffic can converge. The reduction in convergence time can be even more significant for a failed DF node where the outage can be larger if the DF is connected to multiple ES segments.

Figure 13:
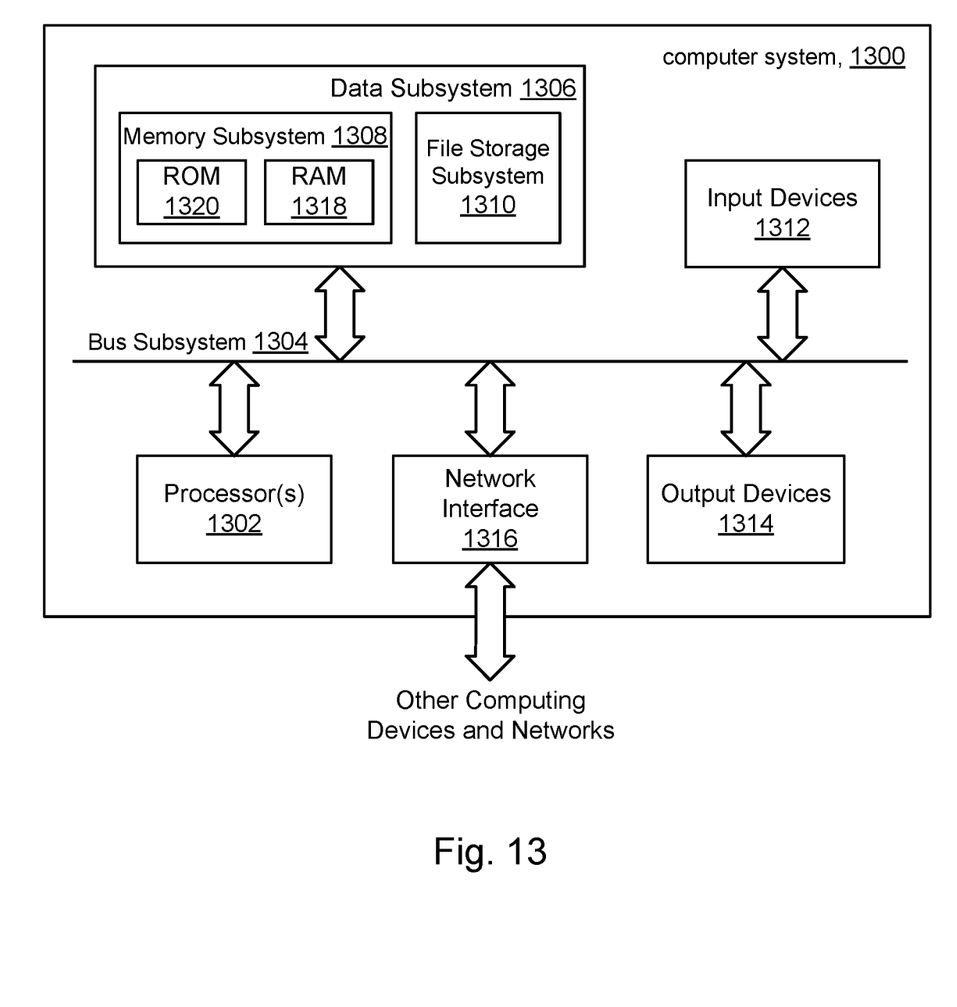
FIG. 13 shows an illustrative computing system adapted in accordance with the present disclosure.

FIG. 13 depicts a simplified block diagram of an example computer system 1300 according to certain embodiments.

Computer system 1300 can be used to implement PEs 114 described in the present disclosure. As shown in FIG. 13, computer system 1300 includes one or more processors 1302 that communicate with a number of peripheral devices via bus subsystem 1304. These peripheral devices include data subsystem 1306 (comprising memory subsystem 1308 and file storage subsystem 1310), user interface input devices 1312, user interface output devices 1314, and network interface subsystem 1316.

Bus subsystem 1304 can provide a mechanism that enables the various components and subsystems of computer system 1300 to communicate with each other as intended. Although bus subsystem 1304 is shown schematically as a single bus, alternative embodiments of the bus subsystem can utilize multiple busses.

Network interface subsystem 1316 can serve as an interface for communicating data between computer system 1300 and other computer systems or networks. Embodiments of network interface subsystem 1316 can include, e.g., an Ethernet card, a Wi-Fi and/or cellular adapter, and the like.

User interface input devices 1312 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1300.

User interface output devices 1314 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1300.

Data subsystem 1306 includes memory subsystem 1308 and file/disk storage subsystem 1310 represent non-transitory computer-readable storage media that can store program code and/or data, which when executed by processor 1302, can cause processor 1302 to perform operations in accordance with embodiments of the present disclosure.

Memory subsystem 1308 includes a number of memories including main random access memory (RAM) 1318 for storage of computer executable instructions and data during program execution and read-only memory (ROM) 1320 in which fixed instructions are stored. File storage subsystem 1310 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1300 is illustrative and many other configurations having more or fewer components than system 1300 are possible.

We note that the foregoing examples illustrate a virtual network configuration using an underlay network that comprises the physical infrastructure for delivering Ethernet packets, MPLS, Internet and the like and an overlay network that represents the virtual network. The examples generally show an underlay network using unicast (also known as ingress replication) to deliver overlay multicast traffic from one PE to other PEs. It will be appreciated by persons of ordinary skill that the present disclosure can be practiced in a configuration where the underlay traffic can be delivered using multicast instead of unicast. In case of multicast in the underlay, in addition to sending SMET routes, the PE would also join an underlay multicast tree (not to be confused with overlay multicast) to receive the traffic.

Further Examples

In accordance with the present disclosure, a method in a network device, where the network device is a member of a peer group of network devices to which a customer device is multi-homed, comprises: the network device receiving a first join message that specifies a multicast group; the network device advertising a second join message to join the multicast group, wherein only one member of the peer group is a designated forwarder (DF), wherein the network device advertises the second join message regardless of whether the network device is the DF or not; the network device receiving multicast traffic in response to advertising the second join message; and the network device selectively forwarding the received multicast traffic based on whether the network device is the DF or the network device is not the DF.

In some embodiments, the network device is not the DF.

In some embodiments, the method further comprises the network device forwarding the received multicast traffic only when the network device is the DF.

In some embodiments, the method further comprises the network device dropping the received multicast traffic when the network device is not the DF.

In some embodiments, the second join message is a Selective Multicast Ethernet Tag (SMET) route.

In some embodiments, the first message is a message sent from the customer device to the network device.

In some embodiments, the first message is a message sent from a peer network device among the peer group to the network device.

In some embodiments, the network device receives multicast traffic addressed to the multicast group in response to the advertising regardless of whether the network device is the DF or not.

In some embodiments, the method further comprises the network device participating in an election process to elect a new DF in response to the DF becoming unable to forward multicast traffic, wherein the network device is not the DF, wherein the election process does not include the newly elected DF advertising a message to receive multicast traffic.

In accordance with the present disclosure, a network device, among a peer group comprising two or more network devices to which a customer device is multi-homed, comprises: one or more computer processors; and a computer-readable storage medium comprising instructions for controlling the one or more computer processors to: advertise a join message to join a multicast group, wherein exactly one member of the peer group has been previously elected a designated forwarder (DF), wherein the network device advertises the join message regardless of whether the network device is the previously elected DF or not; the network device receiving multicast traffic in response to advertising the join message; and the network device selectively forwarding the received multicast traffic based on whether the network device is the DF or the network device is not the DF.

In some embodiments, the network device is not the DF.

In some embodiments, the network device advertises the join message in response to receiving a trigger sent by the customer device.

In some embodiments, the network device advertises the join message in response to receiving a trigger sent by another network device in the peer group.

In some embodiments, the computer-readable storage medium further comprises instructions for controlling the one or more computer processors to participate in an election process to elect a new DF in response to the DF becoming unable to forward multicast traffic, wherein the network device is not the DF, wherein the election process does not include the newly elected DF advertising a join message to receive multicast traffic. In some embodiments, the computer-readable storage medium further comprises instructions for controlling the one or more computer processors to store forwarding information to forward multicast traffic addressed to the multicast group when the network device is the newly elected DF.

In some embodiments, the computer-readable storage medium further comprises instructions for controlling the one or more computer processors to store forwarding information to drop multicast traffic addressed to the multicast group when the network device is not the newly elected DF.

In accordance with the present disclosure, a method in a network device, where the network device is a member of a peer group of network devices to which a customer device is multi-homed, comprises: advertising a join message to join a multicast group, wherein exactly one member of the peer group has been previously elected a designated forwarder (DF), wherein the network device advertises the join message regardless of whether the network device is the previously elected DF or not; subsequent to advertising the join message participating in an election of a new designated forwarder (DF) from among a plurality of network devices comprising the peer group; in response to the network device being the new DF, storing forwarding information to forward multicast traffic addressed to the multicast group; and in response to the network device not being the new DF, storing forwarding information to drop multicast traffic addressed to the multicast group.

In some embodiments, the method further comprises advertising the join message in response to receiving a trigger sent by the customer device.

In some embodiments, the method further comprises advertising the join message in response to receiving a trigger sent by another network device in the peer group.

In some embodiments, the method further comprises, in response to the network device being the new DF, the new DF does not advertise a join message to join the multicast group.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device that is a member of a peer group of network devices to which a customer device is multi-homed, the method comprising:
   the network device receiving a first join message from the customer device or a peer network device in the peer group, the first join message comprising a group identifier that specifies a multicast group;
   the network device advertising a second join message to join the multicast group, the second join message comprising the group identifier contained in the first join message, wherein only one member of the peer group is a designated forwarder (DF), wherein the network device advertises the second join message regardless of whether the network device is the DF or not;
   the network device receiving multicast traffic in response to advertising the second join message; and
   the network device selectively forwarding the received multicast traffic based on whether the network device is the DF or the network device is not the DF.

2. The method of claim 1, wherein the network device is not the DF.

3. The method of claim 1, further comprising the network device forwarding the received multicast traffic only when the network device is the DF.

4. The method of claim 1, further comprising the network device dropping the received multicast traffic when the network device is not the DF.

5. The method of claim 1, wherein the second join message is a Selective Multicast Ethernet Tag (SMET) route.

6. The method of claim 1, wherein the first join message is an IGMP (Internet Group Management Protocol) message sent from the customer device to the network device.

7. The method of claim 1, wherein the join first message is an EVPN (Ethernet virtual private network) Type 7 route sent from the peer network device in the peer group to the network device.

8. The method of claim 1, wherein the network device receives multicast traffic addressed to the multicast group in response to the advertising regardless of whether the network device is the DF or not.

9. The method of claim 1, further comprising the network device participating in an election process to elect a new DF in response to the DF becoming unable to forward multicast traffic, wherein the network device is not the DF, wherein the election process does not include the newly elected DF advertising a message to receive multicast traffic.

10. A network device among a peer group comprising two or more network devices to which a customer device is multi-homed, the network device comprising:
   one or more computer processors; and
   a computer-readable storage medium comprising instructions for controlling the one or more computer processors to:
      advertise a join message to join a multicast group, the join message comprising a group identifier of the multicast group contained in a previously received message, wherein exactly one member of the peer group has been previously elected a designated forwarder (DF), wherein the network device advertises the join message regardless of whether the network device is the previously elected DF or not;
      the network device receiving multicast traffic in response to advertising the join message; and
      the network device selectively forwarding the received multicast traffic based on whether the network device is the DF or the network device is not the DF.

11. The network device of claim 10, wherein the network device is not the DF.

12. The network device of claim 10, wherein the network device advertises the join message in response to receiving a trigger sent by the customer device, wherein the trigger comprises the group identifier.

13. The network device of claim 10, wherein the network device advertises the join message in response to receiving a trigger sent by another network device in the peer group, wherein the trigger comprises the group identifier.

14. The network device of claim 10, wherein the computer-readable storage medium further comprises instructions for controlling the one or more computer processors to participate in an election process to elect a new DF in response to the DF becoming unable to forward multicast traffic, wherein the network device is not the DF, wherein the election process does not include the newly elected DF advertising a join message to receive multicast traffic.

15. The network device of claim 14, wherein the computer-readable storage medium further comprises instructions for controlling the one or more computer processors to store forwarding information to forward multicast traffic addressed to the multicast group when the network device is the newly elected DF.

16. The network device of claim 14, wherein the computer-readable storage medium further comprises instructions for controlling the one or more computer processors to store forwarding information to drop multicast traffic addressed to the multicast group when the network device is not the newly elected DF.

17. A method in a network device that is a member of a peer group of network devices to which a customer device is multi-homed, the method comprising:
- advertising a join message to join a multicast group, the join message comprising a group identifier of the multicast group contained in a previously received message, wherein exactly one member of the peer group has been previously elected a designated forwarder (DF), wherein the network device advertises the join message regardless of whether the network device is the previously elected DF or not;
- subsequent to advertising the join message, participating in an election of a new designated forwarder (DF) from among a plurality of network devices comprising the peer group;
- in response to the network device being the new DF, storing forwarding information to forward multicast traffic addressed to the multicast group; and
- in response to the network device not being the new DF, storing forwarding information to drop multicast traffic addressed to the multicast group.

18. The method of claim 17, further comprising advertising the join message in response to receiving a trigger sent by the customer device, wherein the trigger comprises the group identifier.

19. The method of claim 17, further comprising advertising the join message in response to receiving a trigger sent by another network device in the peer group, wherein the trigger comprises the group identifier.

20. The method of claim 17, further in response to the network device being the new DF, the new DF does not advertise a join message to join the multicast group.

* * * * *